United States Patent [19]

Ikeda et al.

[11] Patent Number: 4,614,689

[45] Date of Patent: Sep. 30, 1986

[54] NON-OXIDE-SERIES-SINTERED CERAMIC BODY AND METHOD FOR FORMING CONDUCTING FILM ON THE SURFACE OF NON-OXIDE-SERIES-SINTERED CERAMIC BODY

[75] Inventors: Kazuo Ikeda; Akio Sayano; Shun-ichiro Tanaka, all of Yokohama, Japan

[73] Assignee: Kabushiki Kaisha Toshiba, Kawasaki, Japan

[21] Appl. No.: 603,452

[22] Filed: Apr. 24, 1984

[30] Foreign Application Priority Data

Apr. 28, 1983 [JP] Japan ................................. 58-76000

[51] Int. Cl.$^4$ ................................................ B05D 5/12
[52] U.S. Cl. ................................. 428/409; 427/126.2; 427/299; 427/376.2; 427/377; 427/399; 427/443.2; 428/697; 428/698; 428/704
[58] Field of Search ...................... 427/226, 376.2, 377, 427/443.2, 399, 299, 191, 93, 190, 126.2; 428/689, 704, 409, 698, 697; 148/6.11

[56] References Cited

U.S. PATENT DOCUMENTS

| | | | |
|---|---|---|---|
| 2,780,561 | 2/1957 | Forge | 427/377 |
| 2,993,814 | 7/1961 | Epprecht et al. | 427/377 |
| 3,120,453 | 2/1964 | Fitzer et al. | 428/698 |
| 3,215,555 | 11/1965 | Krey | 427/377 |
| 3,535,154 | 10/1970 | Meyer-Simon | 427/226 |
| 3,620,799 | 11/1971 | Hoelscher et al. | 427/377 |
| 3,713,865 | 1/1973 | Leeds | 427/377 |
| 3,801,363 | 4/1974 | Buck | 427/377 |
| 3,808,044 | 4/1974 | Hoffmann | 427/399 |
| 4,137,361 | 1/1979 | Deffeyes | 428/698 |
| 4,252,862 | 2/1981 | Nishida | 428/698 |
| 4,522,453 | 6/1985 | Lammer et al. | 428/698 |

OTHER PUBLICATIONS

Thorne et al, Inorganic Chemistry, Nordeman Publishing Co. (1943).

*Primary Examiner*—Norman Morgenstern
*Assistant Examiner*—Janyce A. Bell
*Attorney, Agent, or Firm*—Cushman, Darby & Cushman

[57] ABSTRACT

A non-oxide-series-sintered ceramic body, which has a conductive film on its surface and which permits a strong bond to a metal member, the conductive film comprising a metal silicide selected from the group consisting of molybdenum silicide and tungsten silicide.

13 Claims, 1 Drawing Figure

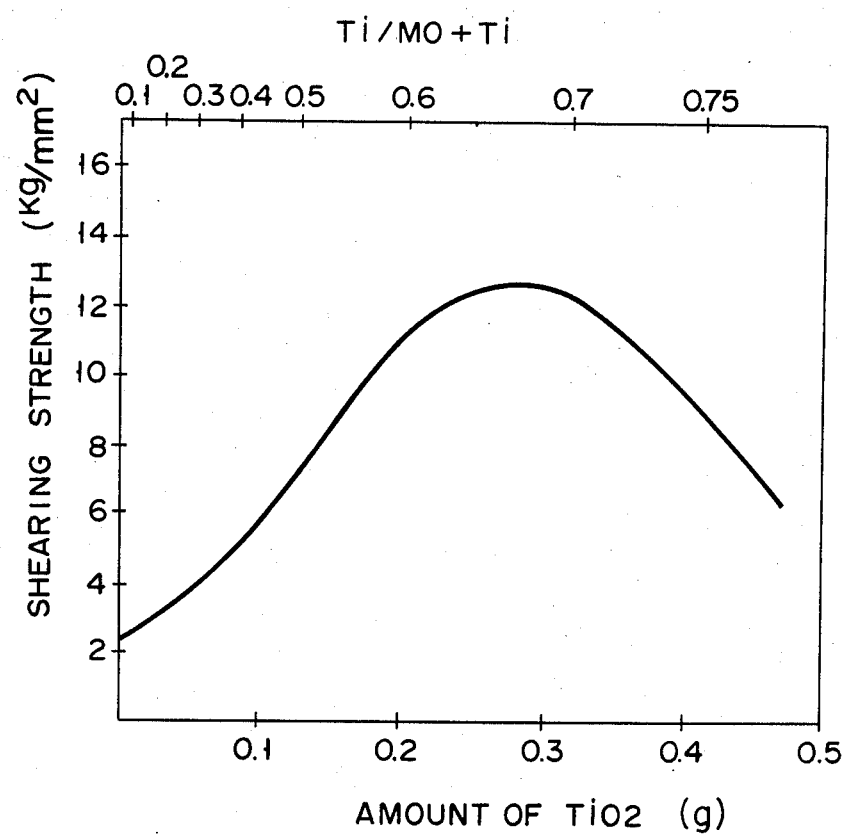

NON-OXIDE-SERIES-SINTERED CERAMIC BODY AND METHOD FOR FORMING CONDUCTING FILM ON THE SURFACE OF NON-OXIDE-SERIES-SINTERED CERAMIC BODY

BACKGROUND OF THE INVENTION

This invention relates to a non-oxide-series-sintered ceramic body and a method for forming a conductive film on the surface of a non-oxide-series-sintered ceramic body.

It is common practice to form a conductive film on the surface of a sintered ceramic body so as to obtain a bond between a sintered ceramic body and a metallic member. It is possible to electroplate, for example, nickel on the conductive film and bond the nickel film to the metallic member by brazing, etc. The conventional method for forming such a conductive film comprises coating a metallized paste, consisting mainly of molybdenum powder and manganese powder, on the surface of a sintered body, and sintering it done in a reducing atmosphere. This method is successfully applied to an oxide-series-sintered ceramic body such as alumina, but cannot necessarily be applied to a non-oxide-series-sintered ceramic body such as silicon nitride, which has recently been highlighted in view of its excellent wear resistance and its high-temperature performance, because no reaction occurs between the metallized paste and the non-oxide-series-sintered ceramic body and because it is difficult to form a conductive film with better adhesion. As a method for forming a conductive film on the surface of the non-oxide-series-sintered ceramic body, an attempt is made to impregnate ammonium molybdate into the surface of a porous-sintered ceramic body consisting of silicon nitride obtained by, for example, a reactive sintering method and a reduce ammonium molybdate to form a conductive film on the surface of a ceramic body. Since the conductive film is comprised of molybdenum with a thermal expansion coefficient substantially equal to that of the silicon nitride ceramics, this method is effective in obtaining a bond between the sintered ceramic bodies. Where, however, a bond is to be obtained between the sintered ceramic body and the metallic member, such as a steel member in particular, debonding or cracks occur during and after a bonding period due to a difference in the thermal expansion coefficient between the molybdenum and the steel. As a result, an adequate bonding strength is not obtained.

SUMMARY OF THE INVENTION

An object of ths invention is to provide a non-oxide-series-sintered ceramic body having a conductive film on its surface.

An another object of this invention is to provide a method for forming a conductive film on the surface of a non-oxide-series-sintered ceramic body which permits a strong bond to a metal member, in particular a steel member.

A non-oxide-series-sintered ceramic body of this invention has a conductive film on its surface. The conductive film comprises molybdenum silicide or tungsten silicide. The film may preferably consist essentially of mixture of the silicide and nitride of a group IVB transition metal.

A method according to this invention of forming a conductive film comprises coating a metal molybdate film or a metal tungstate film on the surface of a non-oxide-series-sintered ceramic body, melting the metal molybdate or metal tungstate film, and sintering the resultant body in a reducing atmosphere to form a conductive film on the surface of the ceramic body. For a non-oxide-series-sintered ceramic body, use is made in this invention of silicon-bearing ceramics, for example, silicon nitride, silicon carbide, Si—Al—O—N, etc. The ceramic body may preferably contain silicon and nitrogen like silicon nitride, Si—Al—O—N, etc. Particularly, use is made of a dense material obtained by low-pressure sintering, hot-pressure sintering, etc. According to this invention, lithium molybdate, potassium molybdate, calcium molybdate, sodium molybdate, lead molybdate, etc., are used as the metal molybdate. Metal tungstate includes potasium tungstate, calcium tungstate, sodium tungstate, magnesium tungstate, and the like.

A Group IVB transition metal suitable for the present invention is Ti or Zr, and Ti is preferred to Zr.

According to this invention, a metal molybdate or tungstate film can be formed on the surface of a non-oxide-series-sintered ceramic body by either coating it with a paste or a liquid containing metal molybdate or tungstate, or dipping it into a metal molybdate or tungstate liquid. A metal molybdate or tungstate solution or suspension can be used as a liquid containing the metal molybdate or tungstate. The liquid may further contain a compound forming nitride of IVB transition metal such as titanium nitride, for example, titanium dioxide ($TiO_2$), titanium borate (TiB), basic titanium sulfate ($TiO\ SO_4 \cdot nH_2O$: N=O or integer), isopropyl orthotitanate [$Ti[COH(CH_3)_2]_4$], metal titanium, etc. The metal molybdate or tungstate-coated ceramic body is, after being heated to, for example, 100° to 200° C. for drying, air heated at a temperature exceeding a melting point of metal molybdate or tungstate, to melt the metal molybdate or tungstate. The process of melting the metal molybdenum or tungstate is effected so as to obtain a stronger bond to the ceramic body and improve the wettability of the metal molybdate. Then, the body is sintered at a temperature more than 1,000° C., preferably 1,100° to 1,400° C., in a reducing gaseous atmosphere, such as hydrogen or gas mixture of $N_2$ and $H_2$, to form a conductive film on the surface of the ceramic body.

The conductive film so obtained is comprised of molybdenum or tungsten silicide, which is formed through a reaction of the molybdenum or tungsten in the metal molybdate or tungstate with the silicon in the ceramic body. The conductive film may contain unreacted molybdenum or tungsten. It is therefore possible to obtain a structure with a strong bond between the ceramic body and the metallic member through the conductive film and a nickel film electroplated on the surface of the conductive film. The reaction of the molybdenum with the silicon is accelerated through an attack of the metal in the metal molybdate or tungstate upon the surface of the ceramic body, which causes the surface of the body to be roughened. As a result, a conductive film of excellent adhesion is obtained.

BRIEF DESCRIPTION OF THE DRAWING

The FIGURE shows a graph representing the relation of an amount of titanium dioxide added to a lithium molybdate containing liquid has with the strength of a bond between a silicon nitride sintered body and a steel member.

DETAILED DESCRIPTION OF THE PREFERRED EMBODIMENT

The method of this invention will now be explained below.

EXAMPLE 1

An aqueous solution of 0.3 g of lithium molybdate in 1.8 cc of pure water was coated on the surface of a sintered body (shape: rectangle, dimension: $1\times1\times4$ mm) comprised of silicon nitride. The resultant body was, after being dried at a temperature of 150° C., air heated at a temperature of about 800° C. for 10 minutes to cause the lithium molybdate to be heated, and then sintered at a temperature of about 1,400° C., for 60 minutes in a mixing gas containing an about 1:1 volume ratio of nitrogen and hydrogen, thus obtained a molybdenum silicide conductive film on the surface of the sintered body. Nickel was electroplated on the conductive film and then the Ni-plated body was bonded by a silver solder to a steel member (shape: rectangle, dimension: $1\times2\times3$ mm), noting that a bond strength was about 2.3 kg/mm$^2$.

EXAMPLE 2

A conductive film was formed on the surface of a sintered body in the same method as in Example 1, except that titanium dioxide was added to an aqueous solution of lithium molybdate in varying amounts. The resultant structure was bonded to a steel member, followed by measuring the bond strength. In this case, a thin copper plate was inserted between the ceramic body and the steel member to absorb stress. The result of measurement is shown in an appended Figure. From the Figure it will be understood that a greater bond strength was obtained when 0.1 to 0.5 g of titanium dioxide, that is, the amount of titanium dioxide satisfying the equation $0.4<\text{Ti}/\text{Mo}+\text{Ti}$ (atomic ratio)$<0.8$, was used.

As evident from the above explanation, according to the method of this invention a metal, such as lithium, in the metal molybdate or tungstate attacks the surface of the ceramic body causing the surface to be roughened. As a result, a reaction of the molybdenum or tungsten with the silicon in the ceramic body is hastened to form a conductive film with better adhesion. No debonding or cracks occur through the conductive film and nickel plated on the surface of the conductive film during the bonding process or thereafter, thus obtaining a structure with a greater bond between the ceramic body and the metallic member. Further, when a IVB transition metal compound is added to metal molybdate, the bonding strength can be remarkably increased.

What is claimed is:

1. A non-oxide-series-sintered ceramic body containing silicon and nitrogen, which has a conductive film on its surface, the conductive film comprising (a) a metal silicide selected from the group consisting of molybdenum silicide and tungsten silicide and (b) a nitride of a Group IVA transition metal, said metal silicide being a reaction product of silicon contained in the ceramic body with a metal compound selected from the group consisting of metal molybdate and tungsten silicide, and said nitride being a reaction product of nitrogen contained in the ceramic body with a group IVA transition metal or a compound thereof.

2. The non-oxide-series-sintered ceramic body according to claim 1 wherein said transition metal is one selected from the group consisting of titanium and zirconium.

3. The non-oxide-series-sintered ceramic body according to claim 2, wherein said transition metal is titanium.

4. The non-oxide-series-sintered ceramic body according to claim 3, wherein said metal silicide is molybdenum silicide, and wherein an atomic ratio of Ti/Mo+Ti is more than 0.4 and less than 0.8.

5. A method of forming a conductive film on the surface of a non-oxide-series-sintered ceramic body comprising the steps of (a) coating the surface of a non-oxide-series-sintered ceramic body with a metal compound selected from the group consisting of metal molybdate and metal tungstate, (b) melting the metal compound, and (c) sintering the resultant structure in a reducing atmosphere to form said conductive film on the surface of the ceramic body, said ceramic body containing nitrogen and said metal compound containing a group IVB transition metal or compound thereof.

6. The method according to claim 5, wherein said transition metal is one selected from the group consisting of titanium and zirconium.

7. The method of claim 5, in which said non-oxide-series-sintered ceramic body is a silicon-bearing ceramic body.

8. The method of claim 7, in which said silicon-bearing ceramic body is silicon nitride and Sialon.

9. The method of claim 5, in which said metal molybdate is selected from the group consisting of lithium molybdate, potassium molybdate, calcium molybdate, sodium molybdate, and lead molybdate.

10. The method of claim 5, in which said step (a) is carried out by coating a metal molybdate-containing liquid or paste on the surface of the ceramic body.

11. The method of claim 5, in which said step (a) is effected by dipping said ceramic body into a metal molybdate liquid.

12. The method of claim 5, in which said step (c) is effected at a temperature of 1,100° to 1,500° C.

13. The method according to claim 6, wherein said metal compound is a metal molybdate, and wherein an atomic ratio of Ti/Mo+Ti is more than 0.4 and less than 0.8.

* * * * *